(12) United States Patent
Tsuboi

(10) Patent No.: US 9,323,907 B2
(45) Date of Patent: Apr. 26, 2016

(54) DISTRIBUTION APPARATUS, DEVICE, CONTROL METHOD FOR DISTRIBUTION APPARATUS, AND STORAGE MEDIUM

(71) Applicant: CANON KABUSHIKI KAISHA, Tokyo (JP)

(72) Inventor: Masanori Tsuboi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/166,086

(22) Filed: Jan. 28, 2014

(65) Prior Publication Data
US 2014/0237613 A1 Aug. 21, 2014

(30) Foreign Application Priority Data

Feb. 18, 2013 (JP) ................................. 2013-028658

(51) Int. Cl.
*G06F 19/00* (2011.01)
*G06F 21/12* (2013.01)
(52) U.S. Cl.
CPC ........ *G06F 21/12* (2013.01); *G06F 2221/0742* (2013.01); *G06F 2221/0753* (2013.01)

(58) Field of Classification Search
CPC ................................................ G06F 17/30421
See application file for complete search history.

(56) References Cited

U.S. PATENT DOCUMENTS 8,583,559 B2 11/2013 Nakashima
2003/0167320 A1* 9/2003 Perez ............................ 709/223
2007/0073627 A1* 3/2007 Richards ......................... 705/59

FOREIGN PATENT DOCUMENTS

JP 2011-14106 A 1/2011

* cited by examiner

*Primary Examiner* — Josnel Jeudy
(74) *Attorney, Agent, or Firm* — Carter, DeLuca, Farrell & Schmidt, LLP

(57) ABSTRACT

A distribution apparatus accepts registration of an application program configured to provide a specific service to a device and an extension application program. When an application program that is specified by the extension application program is registered, the image forming apparatus manages the extension application program by linking it with the application program. When a license key has been received, the distribution apparatus distributes, to the image forming apparatus, an application program specified by a license key and/or an extension application program linked to the application program.

13 Claims, 17 Drawing Sheets

FIG. 11

| Application name | Product name | License number |
|---|---|---|
| Host bundle 1 | Product 1 | 1000 |
| Fragment bundle 2 | Product 2 | 1001 |

| Host bundle name | Fragment bundle name | Type |
|---|---|---|
| Host bundle 1 | Fragment bundle 1 | Fee-free |
|  | Fragment bundle 2 | Fee-based |

1701 — Select application and press execute button

| Application name | Version |
|---|---|
| ☐ Application A (Fee-free) | 1.0 |
| ☐ Language : English (Fee-based) | 1.0 |
| ☐ Additional function X | 1.0 |

[Cancel] [Execute]

FIG. 17B

1702 — Select application and press execute button

| Application name | Version |
|---|---|
| ☐ Application A (Fee-free) | 1.0 |
| ☑ Language : English (Fee-based) | 1.0 |
| ☐ Additional function X | 1.0 |

[Cancel] [Execute]

FIG. 17C

1703 — Installation completion screen

| Application name | Version | Installation result |
|---|---|---|
| (Fee-free) Language : English | 1.0 | Successful |

1901 — Select installed application to be updated

| | Application name | Version |
|---|---|---|
| ✓ | | |
| ☑ | Application A | 1.0 |
| ☐ | Application B | 1.0 |
| ☐ | Application C | 1.0 |

[Cancel]  [Execute]

FIG. 19B

1902 — Select application and press execute button

Application name      Version
☐ Application A          1.0
(Fee-free)
  ☐ Language : English   1.0
(Fee-based)
  ☐ Additional function X  1.0

[Cancel]  [Execute]

FIG. 19C

1903 — Select application and press execute button

Application name      Version
☐ Application A          1.0
(Fee-free)
  ☑ Language : English   1.0
(Fee-based)
  ☐ Additional function X  1.0

[Cancel]  [Execute]

FIG. 19D

1904 — Installation completion screen

Application name    Version    Installation result
(Fee-free)
Language : English    1.0       Successful

2001 — Select application and press execute button

| Application name | Version |
|---|---|
| ☐ Application A | 1.0 |
| (Fee-free) | |
| ☐ Language : English | 1.0 |
| ☐ Language : French | 1.0 |
| ☐ Language : Italian | 1.0 |
| ☐ Language : German | 1.0 |
| ☐ Language : Spanish | 1.0 |

[ Cancel ]   [ Execute ]

FIG. 20B

2002 — Select application and press execute button

| Application name | Version |
|---|---|
| ☐ Application A | 1.0 |
| (Fee-free) | |
| ☑ Language : English | 1.0 |
| ☑ Language : French | 1.0 |
| ☑ Language : Italian | 1.0 |
| ☑ Language : German | 1.0 |
| ☑ Language : Spanish | 1.0 |

[ Cancel ]   [ Execute ]

FIG. 20C

2003 — Installation completion screen

| Application name | Version | Installation result |
|---|---|---|
| (Fee-free) | | |
| Language : English | 1.0 | Successful |
| Language : French | 1.0 | Successful |
| Language : Italian | 1.0 | Successful |

[ OK ]

DISTRIBUTION APPARATUS, DEVICE, CONTROL METHOD FOR DISTRIBUTION APPARATUS, AND STORAGE MEDIUM

BACKGROUND OF THE INVENTION

1. Field of the Invention

The present invention relates to a distribution technique for distributing an application to a device.

2. Description of the Related Art

Open Services Gateway initiative (OSGi) framework has been proposed which manages the lifecycle of an application such as starting and stopping the application. The OSGi framework defines an application format as a jar file that is a compression format of Java (Registered Trademark). The jar file merges a plurality of class files in one as an archive. The jar file interiorly includes a manifest file called MANIFEST.MF and the description of the jar file is set forth. By describing attributes of the OSGi specification in the manifest file, the OSGi framework manages the lifecycle of an application in accordance with the described attributes.

The application main body is defined as a host bundle in the OSGi specification. Furthermore, the modified or extended portion (extension application program) of the host bundle is defined as a fragment bundle. The fragment bundle does not independently operate and is a bundle that is added (attached) to the class loader space of the host bundle. During modification or extension of the application, use of the fragment bundle for modification or extension may enables release and evaluation of only differences, to thereby promote development efficiency or reduction in the number of testing and evaluation processing steps.

Attempts are being made to install and mount an application from an external on an image forming apparatus, and an image forming apparatus has been proposed which mounts a configuration that is compliant with the OSGi framework.

Japanese Patent Application Laid-Open No. 2011-14106 discloses an information processing apparatus that stores a license file that has been used to install a main application in a storage unit, and install the extension file by using the license file.

However, conventionally a distribution apparatus has not been proposed that can distribute an application program together with an extension application program relating to the application program. Furthermore, in the conventional technique, the extension application program can be installed without conditions, and the distribution of the extension application program is not controlled depending on the type of extension application program. Consequently, in the conventional technique, it is impossible to prepare an extension application program on a fee basis or fee-free basis, and control the installation depending on the type of the extension application.

SUMMARY OF THE INVENTION

According to the present invention, a configuration is provided that links and manages an application program and an extension application program, and distributes the application program and the extension application program in response to a request from a device.

The distribution apparatus according to one aspect of the present invention includes; an accepting unit configured to accept registration of an application program configured to provide a specific service to a device and an extension application program configured to extend the service of the application program, a managing unit configured to manage the extension application program by linking it with an application program when the application program that is specified by the extension application program is registered, and a distributing unit configured to distribute, to the device, an application program specified by a license key and/or an extension application program linked to the application program when the license key has been received.

Further features of the present invention will become apparent from the following description of exemplary embodiments with reference to the attached drawings.

BRIEF DESCRIPTION OF THE DRAWINGS

FIG. 11 illustrates DB information in a product management table.

FIG. 12 illustrates DB information in an application management table.

FIG. 17A to FIG. 17C illustrate an example of a selection screen and an installation completion screen.

FIG. 19A to FIG. 19D illustrate an example of a selection screen and an installation completion screen.

FIG. 20A to FIG. 20C illustrate an example of a selection screen and an installation completion screen.

BRIEF DESCRIPTION OF THE EMBODIMENTS

A description will be given below of the present embodiment of the present invention with reference to the figures. A configuration of the present embodiment described below is merely exemplary, and are not intended to limit the scope of the present invention.

Figure 1A:
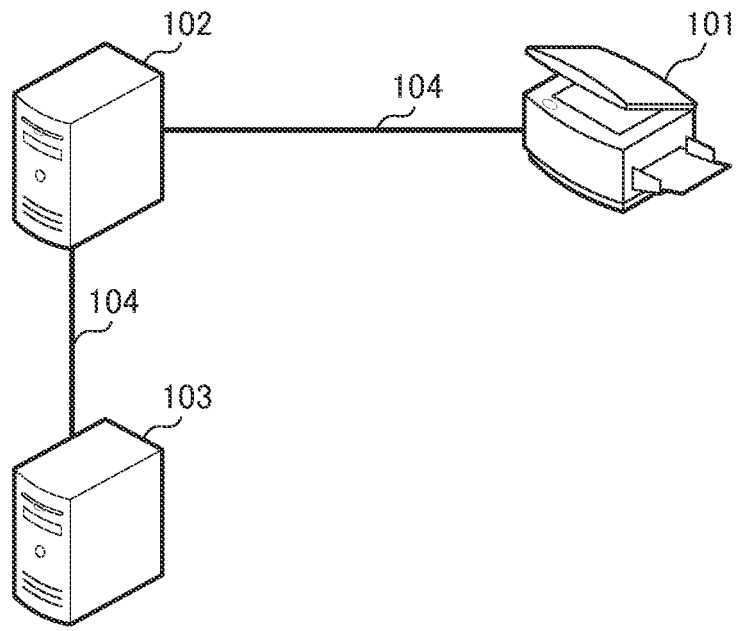
FIG. 1A and FIG. 1B illustrate an example of a system configuration according to the present exemplary embodiment.
Figure 1B:
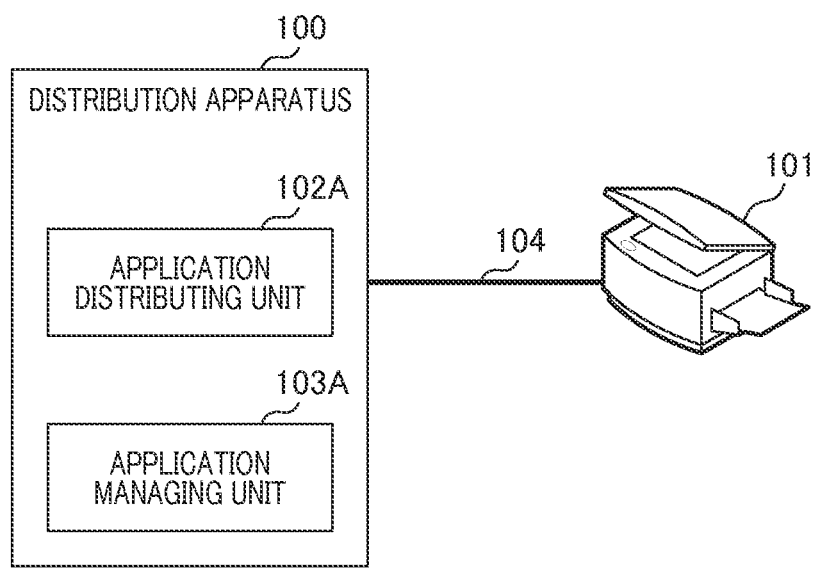

FIG. 1A and FIG. 1B illustrate a configuration example of the system according to the present invention. The system illustrated in FIG. 1A includes an image processing device 101, an application distribution server 102, and an application management server 103. The image processing device 101 and the application distribution server 102 can communicate through a network 104. The application distribution server 102 and the application management server 103 can communicate through the network 104.

The image forming apparatus is a device that includes functions such as a printer, a scanner, a copying machine, or a FAX. The image forming apparatus 101 can install a plurality of applications (application programs). The image forming apparatus 101 has a unique device ID that is allocated to an image forming device. In the following discussion, the application may be simply referred to as an "app".

The application distribution server 102 distributes the application to the image forming apparatus 101. The application management server 103 registers and manages the product application that is installed on the image forming device. The network 104 may be the Internet or the like. The application that is installed on the image forming device is, for example, a host bundle and/or a fragment bundle. The host bundle is an application program that is configured to provide a specific service to the image forming device. The fragment bundle is an extension application program configured to extend the service of the host bundle.

The distribution apparatus 100 as illustrated in FIG. 1B may be configured by the application distribution server 102 and the application management server 103. The distribution apparatus 100 includes an application distributing unit 102A and an application managing unit 103A. The application distributing unit 102A includes the same functions as the application distribution server 102 illustrated in FIG. 1A. The application managing unit 103A includes the same functions as the application managing unit 103 illustrated in FIG. 1A. The distribution apparatus 100 distributes an application to the image processing device 101.

Figure 2:
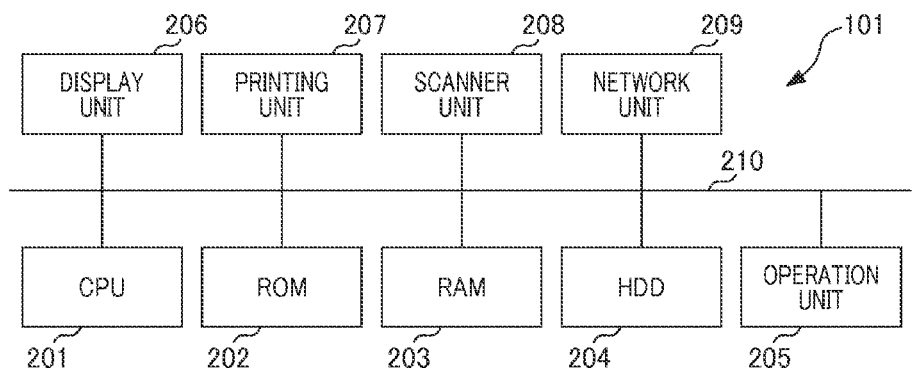
FIG. 2 illustrates a hardware configuration example of an image forming apparatus.

FIG. 2 illustrates a hardware configuration example of an image forming apparatus. The image forming apparatus 101 includes a central processing unit (CPU) 201 to a bus 210. The CPU 201 executes various types of computer programs so as to control the overall operation of the image forming apparatus 101.

The read only memory (ROM) 202 stores various types of computer programs. The random access memory (RAM) 203 is a system work memory configured to be operated by the CPU 201 and temporary storing various types of data. The CPU 201 loads a program stored in the ROM 202 into the RAM 203 to thereby execute the program. The RAM 203 may be configured by a FRAM (registered trademark) and a SRAM that retain the stored contents after the power source is turned OFF, a DRAM that deletes the stored contents after the power source is turned OFF, or the like. SRAM is an abbreviation for static random access memory, and DRAM is an abbreviation for dynamic random access memory.

The hard disk drive (HDD) 204 stores various types or programs. The CPU 201 loads a program stored in the HDD 204 into the RAM 203 to thereby execute the program. The data of the RAM 203 may be stored in the HDD 204.

An operation unit 205 accepts input information corresponding to a user operation. A display unit 206 displays a user interface (UI) of the image forming apparatus. A printing unit 207 can transmit/receive data to/from various units through the bus 210. The printing unit 207 can print various types of image data such as raster images or the like onto a recording medium, or transmit the same to an external device.

A scanner unit 208 reads a manuscript that has been placed on a document positioning plate to thereby generate image data. A network unit 209 connects the image forming apparatus 101 to the application distribution server 102. The processing unit illustrated in FIG. 2 can transmit/receive data through the bus 210.

Figure 3:
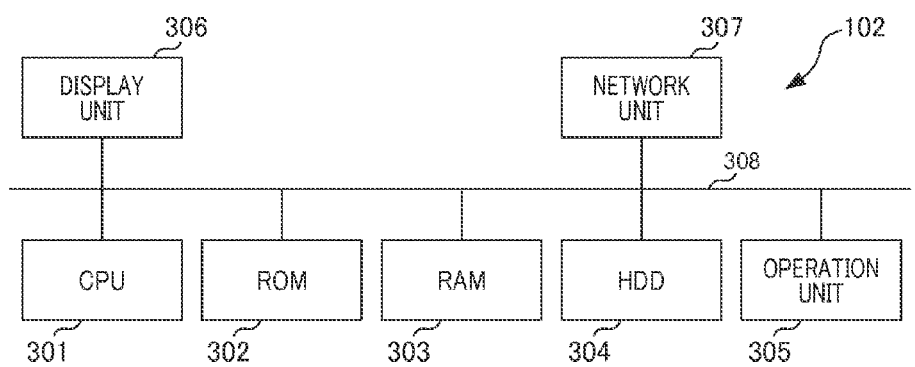
FIG. 3 illustrates a hardware configuration example of an application distribution server.

FIG. 3 illustrates a hardware configuration example of an application distribution server 102. The application distribution server 102 includes a CPU 301 to a bus 308. The CPU 301 to a display unit 306 are the same as the CPU 201 to the display unit 206 illustrated in FIG. 2. Furthermore, the bus 308 is the same as the bus 210 illustrated in FIG. 2. A network unit 307 connects the application distribution server 102 to the image forming apparatus 101 and the application management server 103.

Figure 4:
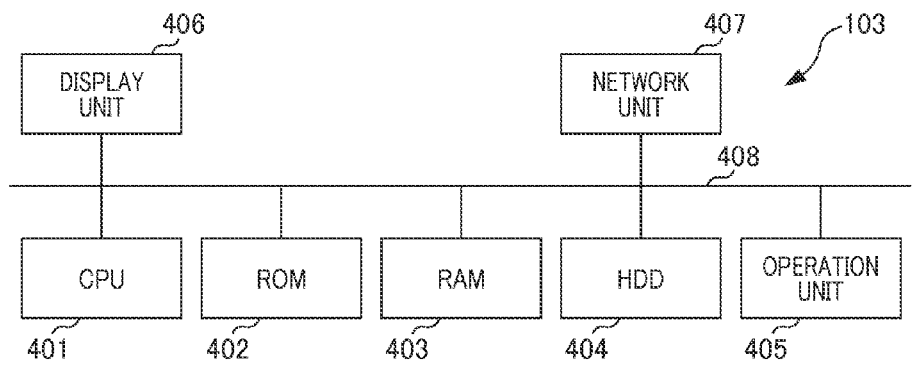
FIG. 4 illustrates a hardware configuration example of an application management server.

FIG. 4 illustrates a hardware configuration example of an application management server 103. The application management server 103 includes a CPU 401 to a bus 408. The CPU 301 to a display unit 106 are the same as the CPU 201 to the display unit 206 illustrated in FIG. 2. Furthermore, the bus 408 is the same as the bus 210 illustrated in FIG. 2. A network unit 407 connects the application management server 103 to the application distribution server 102.

Figure 5A:
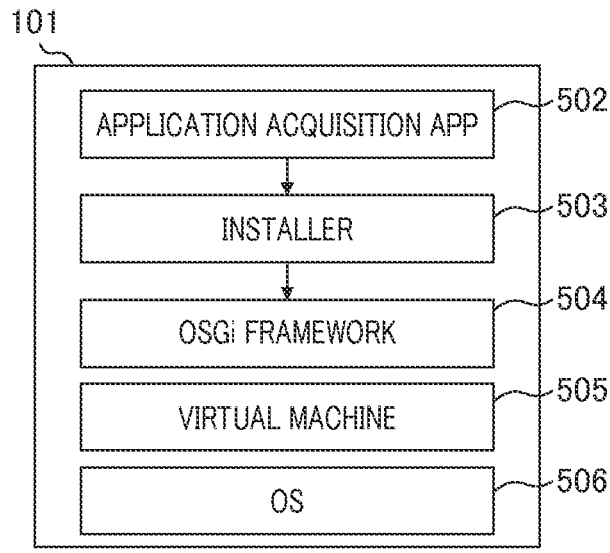
FIG. 5A to FIG. 5C illustrate an example of a functional block diagram of the image forming apparatus, the application distribution server, and the application management server.
Figure 5B:
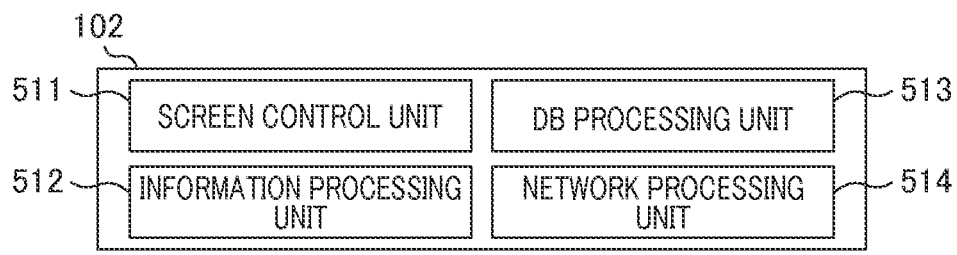
Figure 5C:
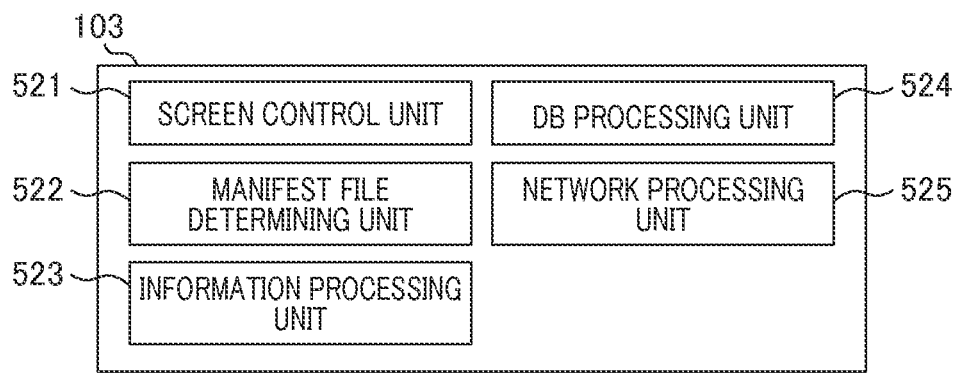

FIG. 5A to FIG. 5C illustrate an example of a functional block diagram of the image forming apparatus, the application distribution server, and the application management server. FIG. 5A is a functional block diagram of the image forming apparatus 101. The program realizing the respective configuration units illustrated in FIG. 5A is stored in the HDD 204. The respective configuration units are executed by loading the program in the RAM 203 and executing it by the CPU 201.

The image forming apparatus 101 includes an application acquisition app 502, an installer 503, an OSGi framework 504, a virtual machine 505 and an OS 506.

The application acquisition app 502 acquires an application from the application distribution server 102 through the network unit 209. The application acquisition app 502 displays a UI or performing an acquisition instruction of the application on the display unit 206 for a user, and executes an installation processing request for the application to the installer 503.

The installer 503 requests the OSGi framework 504 to install the application requested by the application acquisition app 502. The OSGi framework 504 installs the application designated in the installation request from the installer 503, and activates or stops the application. The OSGi framework 504 executes extension operations in conformity with specification of the standard framework defined by the OSGi Alliance.

The virtual machine 505 executes an application. The virtual machine 505 is realized by a virtual machine of Java (registered trademark), or the like. That is to say, the virtual machine 505 is an execution environment configured to be realized on the OS 506 that is a first execution environment, and is a second execution environment configured to execute an application described using a Java base. By preparing such execution environment to the image forming apparatus 101, even after producing the image forming apparatus 101, an application for controlling the printing unit, or the scanner unit of the image forming apparatus 101 can be installed and executed.

The OS 506 controls the overall operation of the image forming device. The OS 506 is a library group that can control the respective modules of the real-time OS that can control various functions of the image forming apparatus 101 in real time, or critically control various functions including an optional device and an extension card of the image forming device. The OS is executed by a module group that provides an interface command to the application that operates upstream thereof.

FIG. 5B illustrates a functional block diagram of the application distribution server 102. The program that executes the various configuration units illustrated in FIG. 5B is stored in the HDD 304. The various configuration units are executed by loading the program into the RAM 303 and executing it by the CPU 301.

The application distribution server 102 includes a screen control unit 511, an information processing unit 512, a DB processing unit 513, and a network processing unit 514. The screen control unit 511 controls registration menu display of applications to be distributed. The information processing unit 512 performs temporary storage or calculation of information. The DB processing unit 513 registers applications to be distributed. The network processing unit 514 executes communication processing with the image forming apparatus 101 and communication processing with the application management server 103.

FIG. 5C illustrates a functional block diagram of the application management server 103. The program that executes the various configuration units illustrated in FIG. 5C is stored in the HDD 404. The various configuration units are executed by loading the program in the RAM 403 and executing it by the CPU 401.

The application management server 103 includes a screen control unit 521, a manifest file determining unit 522, an information processing unit 523, a DB processing unit 524, and a network processing unit 525. The screen control unit 521 executes control of a registration menu display for the application. The manifest file determining unit 522 refers to and processes manifest file information for the application to be registered. More specifically, the manifest file determining unit 522 refers to and processes information in a manifest file 606 of the fragment bundle and in a manifest file 604 of the host bundle as described below.

The information processing unit 523 executes temporary storage or calculation of information. The DB processing unit 524 refers to or registers DB information that is stored in the application management server 103. That is to say, the DB processing unit 513 functions as an accepting unit configured to accept registration of a host bundle and a fragment bundle from the image forming apparatus 101 through the DB processing unit and the network processing unit 525 of the application distribution server 102, and the network 104. The network processing unit 525 executes communication processing with the application distribution server 102.

FIG. 11 and FIG. 12 illustrate an example of DB information. FIG. 11 illustrates DB information in a product management table 1101. The product management table 1101 is an example of a management table for a product retained in the HDD 404 by the application management server 103. The application management server 103 manages an application name 1102 and a product name 1103 by linking them with a license number 1104 in the product management table 1101.

The license number 1104 is a number (license key) that is acquired by a use who purchased the product. The application management server 103 issues a license on the basis of the serial number of the image forming apparatus 101 and the license number. A record (single-line data) 1105 indicates that a host bundle 1 is registered as a product 1 and that the license number "1000" has been issued. In the same manner, a record 1106 indicates that a fragment bundle 2 is registered as a product 2 and that the license number "1001" has been issued.

FIG. 12 illustrates the DB information in the app management table 1201. The app management table 1201 is an example of a management table of which the application management server 103 retains a host bundle and a fragment bundle on the HDD 404. The application management server 103 manages a host bundle name 1202 and a fragment bundle name 1203 by linking the with a fragment bundle type 1204 in the app management table 1201. In the present example, the type 1204 is type information indicating the type of the fragment bundle. In the present example, the type 1204 illustrates whether the fragment bundle is fee-free or fee-based. A record 1205 illustrates that a fee-free fragment bundle 1 and a fee-based fragment bundle 2 are linked with the host bundle 1.

Figure 6:
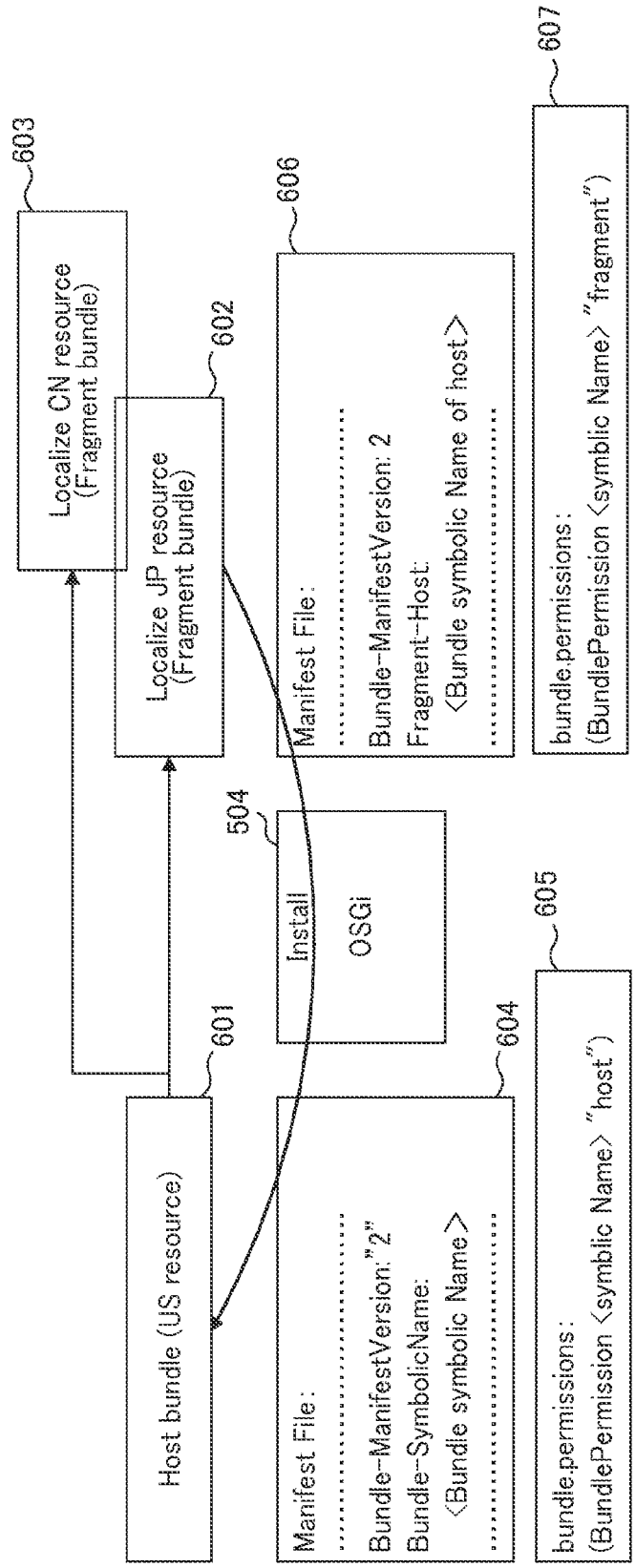
FIG. 6 illustrates the concept of a fragment bundle.

FIG. 6 illustrates the concept of a fragment bundle. In the example illustrated in FIG. 6, assume that fragment bundles 602 and 603 that include a localized resource are installed on the host bundle 601. In order to install the fragment bundle on the host bundle, it is necessary to designate bundle permission and a manifest as discussed below. The bundle permission refers to access permission information for accessing software resources provided in the application. Permission information for the host bundle and the fragment bundle is provided to the application by designating the respective host bundle and the fragment bundle in the bundle permission.

(Manifest 604 of Host Bundle)

The numeral "2" is given as a designation to the Bundle-Manifest Version.

A name that is unique in the framework is given to the Bundle-Symbolic Name.

(Manifest 606 of Fragment Bundle)

The numeral "2" is given as a designation to the Bundle-Manifest Version.

A description "Bundle-Symbolic Name of Host" in the manifest 604 of the host bundle is designated in the Fragment-Host. The Bundle-Symbolic Name refers to a name for uniquely specifying the host.

(Permission 605 of Host Bundle)

The Bundle Permission (Bundle-Symbolic Name, HOST) is designated to the permission 605.

(Permission 607 of Host Bundle)

The Bundle Permission (Bundle-Symbolic Name, FRAGMENT) is designated to the permission 607.

When the fragment bundle is installed in a state in which the above conditions are satisfied, the OSGi framework 504 specifies the host bundle from the manifest information of the fragment bundle. The OSGi framework 504 adds a classpath of the fragment bundle itself to a classpath of the host bundle.

In this context, a "classpath" is for designating she position for reading of the class file by JAVA VM when executing a JAVA app. Furthermore, all the classes and resources in the fragment bundle are loaded by a class loader in the host bundle. In this context, a "class loader" is an object executing searches of the resources or loading of a class, and all classes are loaded onto JAVA VM by the class loader for use in an app.

The execution of loading of the class loader of the host bundle is executed when activating the host bundle, and therefore it is necessary for the host bundle to be temporary stopped and then loaded after the classpath is added. Therefore, when the host bundle is not stopped, installation fails. After the fragment bundle is installed, it can be used as part of the host bundle.

In the present exemplary embodiment, a Japanese language resource 602 and a Chinese language resource 603 are installed as fragment bundles in the host bundle 601 which is the main body. Thereafter, the host bundle 601 uses the Japanese language resource and the Chinese language resource to thereby enable language switching of she resource. The fragment bundle enables extension of the host bundle functions in addition to addition of such language resources.

During uninstalling of the fragment bundle, it is necessary to delete the classpath of the fragment bundle from the classpath of the host bundle, and use the class loader of the host bundle to reload necessary classes into the host bundle. Therefore, uninstallation of the fragment bundle must always be performed in a state in which the host bundle is stopped.

Figure 7:
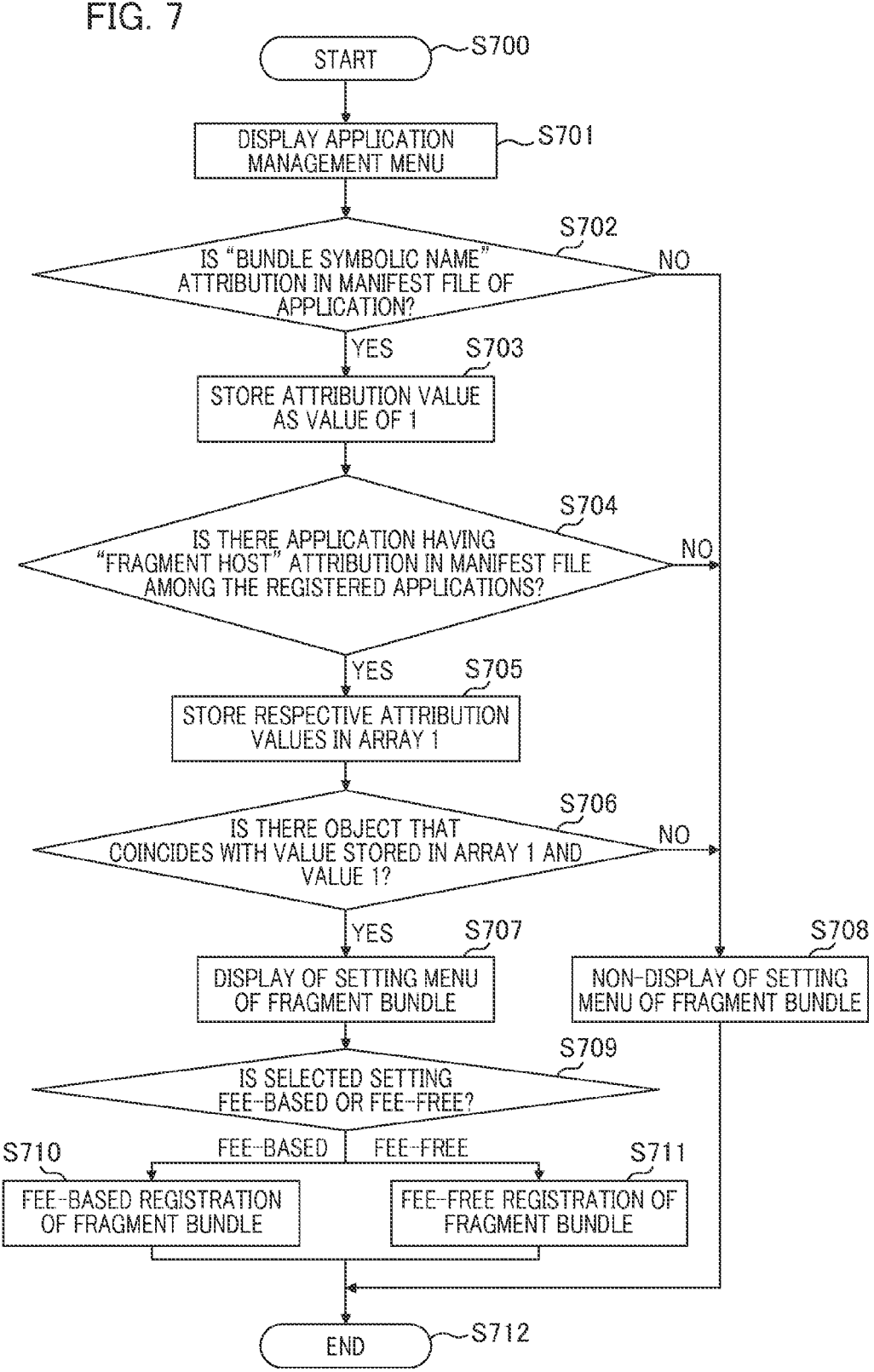
FIG. 7 illustrates an example of the setting process of a fragment bundle.

FIG. 7 is a flowchart that illustrates an example of the setting process of a fragment bundle by the application management server. The processing is started in S700. The screen control unit 521 of the application management server 103 displays a management screen for the application (S701).

Figure 14A:
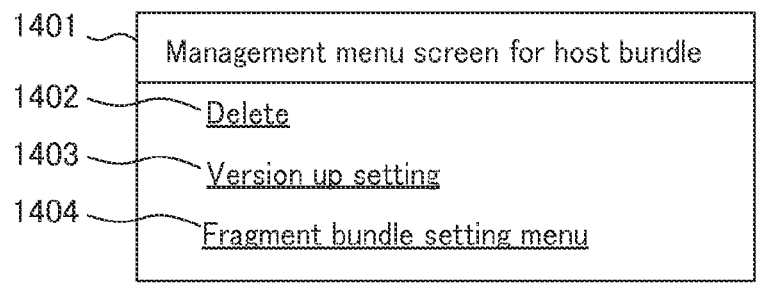
FIG. 14A to FIG. 14E illustrate an example of a management screen, setting screen, setting completion screen for an application.

FIG. 14A illustrates an example of a management screen for an application. The management screen 1401 for the application illustrated in FIG. 14A displays a management menu of the host bundle. The management screen 1401 displays management items including delete 1402, version up settings 1403, and a fragment bundle setting menu 1404. A user presses the fragment bundle setting menu 1404 to execute the following processing steps.

The manifest file determining unit 522 acquires a manifest file for an application corresponding to the management menu from the DB processing unit 524. The manifest file determining unit 522 determines whether there is an attribution of "Bundle-Symbolic Name" in the acquired manifest file (S702).

When there is not an attribution of "Bundle-Symbolic Name" in the acquired manifest file, the application is not a host bundle. Therefore, in this case, the screen control unit 521 does not display the setting menu of the fragment bundle (S708), and the processing is terminated (S712).

When there is an attribution of "Bundle-Symbolic Name" in the acquired manifest file, the application is a host bundle. Therefore, in this case, the information processing unit 523 stores the attribution value as a value of 1 in the RAM 403 (S703).

Next, the DB processing unit 524 determines whether there is an application that has a "Fragment-Host" attribution in the manifest file of the apps that have been registered (S704).

When there is no application having a "Fragment-Host" attribution in the manifest file, there is no fragment bundle. Therefore, in this case, the processing proceeds to S708.

When there is an application having a "Fragment-Host" attribution in the manifest file, there is a fragment bundle. Therefore, in this case, the information processing unit 523 stores the attribution value in an array 1 in the RAM 403 (S705).

Next, the information processing unit 523 determines whether there is an object that coincides with a value stored in the array 1 with the value 1 (S706). More precisely, the information processing unit 523 determines whether there is a fragment bundle that has an attribution value for the "Fragment-Host" that coincides with the attribution value of the "Bundle-Symbolic Name" in the manifest file of the application.

When there is no fragment bundle that has an attribution value for the "Fragment-Host" that coincides with the attribution value of the "Bundle-Symbolic Name" in the manifest file of the application, there is no fragment bundle that corresponds to the host bundle. Therefore, in this situation, the processing proceeds to S708. The screen control unit 521 displays a management menu that does not display the setting menu of the fragment bundle, and the processing is terminated.

Figure 15:
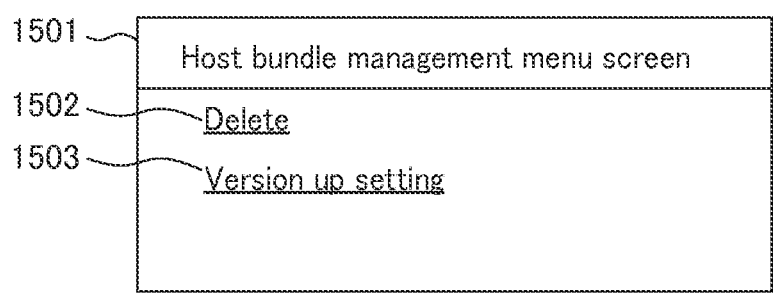
FIG. 15 illustrates an example of a management menu.

FIG. 15 illustrates an example of a management menu displayed in S708 in FIG. 7. The management menu 1501 displays management items including delete 1502 and version up settings 1503 but the setting menu for the fragment bundle is not displayed.

Returning to FIG. 7, when there is a fragment bundle that has an attribution value for the "Fragment-Host" that coincides with the attribution value of the "Bundle-Symbolic Name" in the manifest file of the app, there is a fragment bundle that corresponds to the host bundle. Therefore, the screen control unit 521 displays a setting screen for the fragment bundle (S707).

Figure 14B:
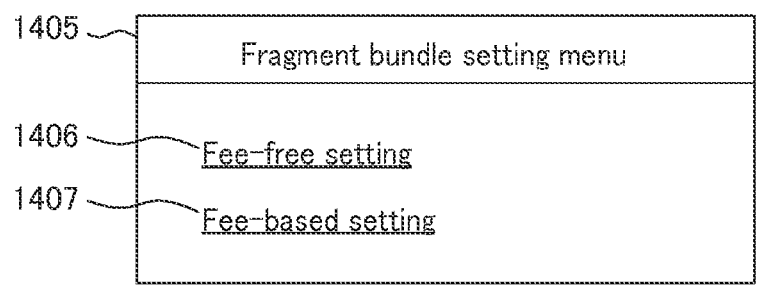
Figure 14C:
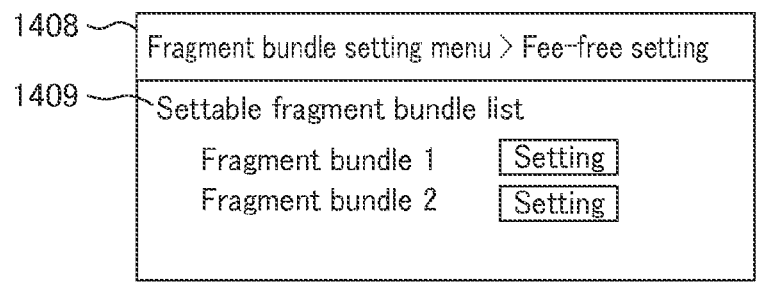

FIG. 14B illustrates an example of a setting screen for a fragment bundle. The setting screen displays a setting menu for the fragment bundle. When the user presses the fee-free setting 1406, the screen transitions to a fee-free setting screen 1408 illustrated in FIG. 14C. Settable fragment bundles are displayed as a list on the display column 1409 in the fee-free setting screen 1408.

Figure 14D:
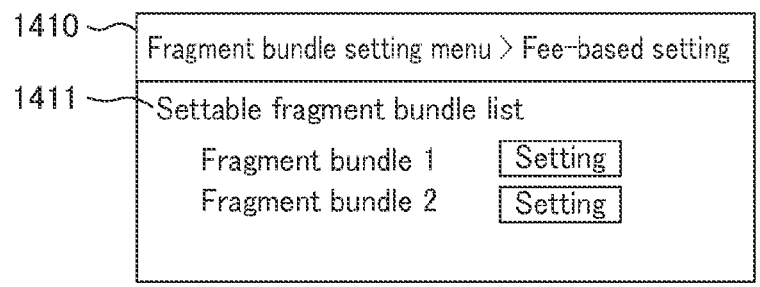
Figure 14E:
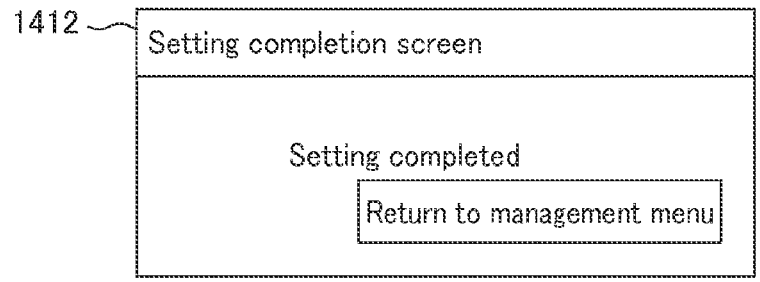

When a user presses the setting button that corresponds to the fragment bundle, the fragment bundle is set with a fee-free setting. That is to say, the DB processing unit 524 of the application management server 103 performs a fee-free setting as the type information of the fragment bundle, and manages the fragment bundle by linking it with the host bundle. Then the screen transitions to a setting completion screen 1412 illustrated in FIG. 14E. On the other hand, when the fee-based setting 1407 is pressed by the user on the setting screen 1405 illustrated in FIG. 14B, the screen transitions to a fee-based setting screen illustrated in FIG. 14D. The settable fragment bundles are displayed as a list on the display column 1411. When a user presses the setting button, the DB processing unit 524 performs a fee-based setting of the fragment bundle corresponding to the setting button, and then the screen transitions to the setting completion screen 1412 illustrated in FIG. 14E.

When the fragment bundle has a fee-based setting, the DB processing unit 524 registers the fragment bundle with the fee-based setting as a product in the product management table 1101. Thereafter, the DB processing unit 524 performs a fee-based setting of the fragment bundle in the app management able 1201 and manages the fragment bundle by linking it with the host bundle.

Returning to FIG. 7, the DB processing unit 524 determines whether the setting of the fragment bundle that has been selected by the user is fee-based or fee-free (S709). When the setting is fee-based, the DB processing unit 524 performs a fee-based setting on the selected fragment bundle (S710), and then the processing is terminated (S712). When the setting is fee-free, the DB processing unit 524 performs a fee-free setting on the selected fragment bundle (S711), and then the processing is terminated (S712). When the fragment bundle is fee-free, the DB processing unit 524 attaches information indicating fee-free as type information corresponding to the fragment bundle to the app management table 1201, and manages the fragment bundle by linking it with the host bundle.

When a fee-based registration is performed, the application acquisition app 502 executes control to prevent installation on an image forming apparatus 101 without input of a new license number through the display unit 206. When a fee-free registration is performed, the application acquisition app 502 executes control to enable installation on an image forming apparatus 101 even without input of a new license number through the display unit 206.

As described with reference to FIG. 7, when the host bundle designated by the fragment bundle is registered, the DB processing unit 524 that is provided with the application distribution server 102 manages the fragment bundle by linking it with the host bundle.

Figure 8:
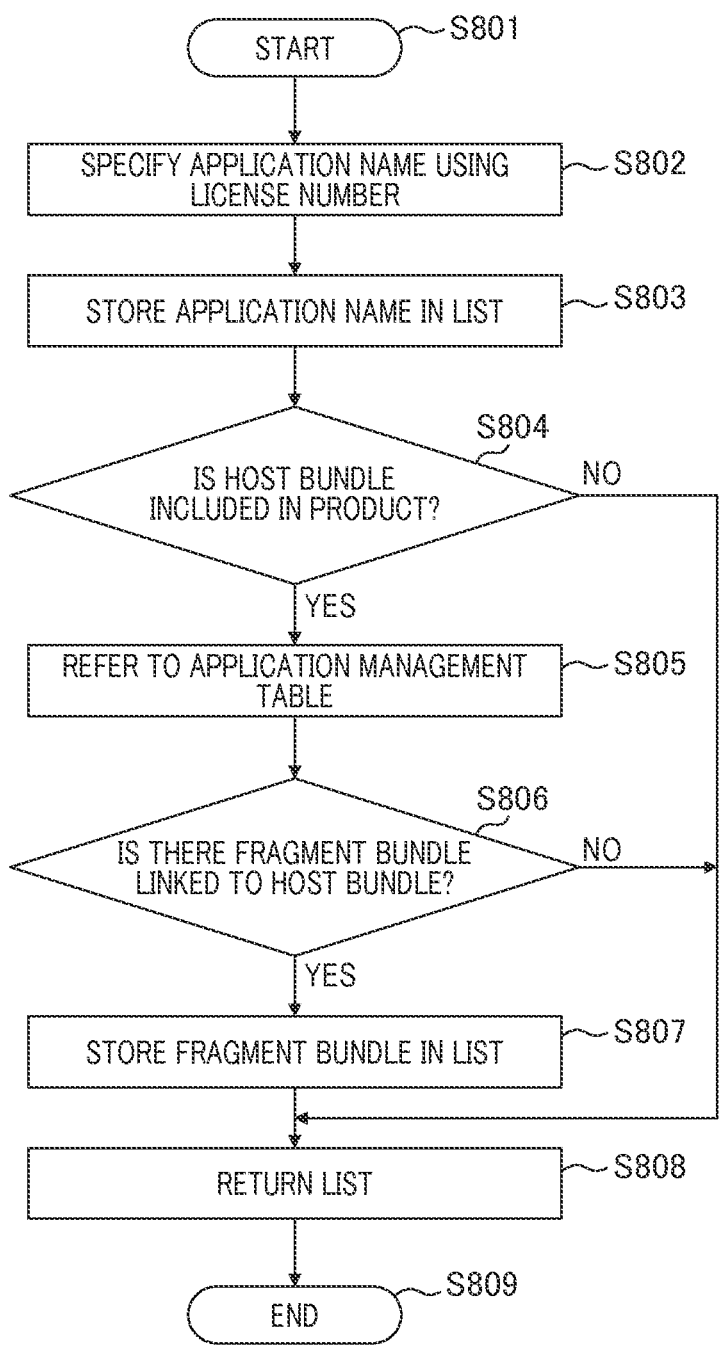
FIG. 8 illustrates an example of the search process of a fragment bundle.

FIG. 8 is a flowchart that illustrates an example of the search process of a fragment bundle in the application management server 103.

Firstly, the application management server 103 starts processing upon receipt of the license number from the image forming apparatus 101 (S801). The DB processing unit 524 refers DB information in the product management table 1101 and specifies the application name corresponding to the received license number (S802).

Next, the information processing unit 523 stores the application name as a list on the RAM 403 (S803). Then the information processing unit 523 determines whether the host bundle is included in the application corresponding to the application name stored on the RAM 403 (S804).

When the host bundle is not included in the application corresponding to the application name stored on the RAM 403, the processing proceeds to S808, and the information processing unit 523 returns the list. When the host bundle is included, in the application corresponding to the application name stored on the RAM 403, the DB processing unit 524 refers the app management table 1201 (S805). The DB processing unit 524 determines whether there is an available fragment bundle that is linked to the host bundle (S806).

When there is no a fragment bundle that is linked to the host bundle, the processing proceeds to S808, and the information processing unit 523 returns the list. When there is a fragment bundle that is linked to the host bundle, the information processing unit 523 stores the fragment bundle as a list on the RAM 403 (S807). Then the information processing unit 523 returns the list (S808), and the processing is terminated (S809).

Figure 9:
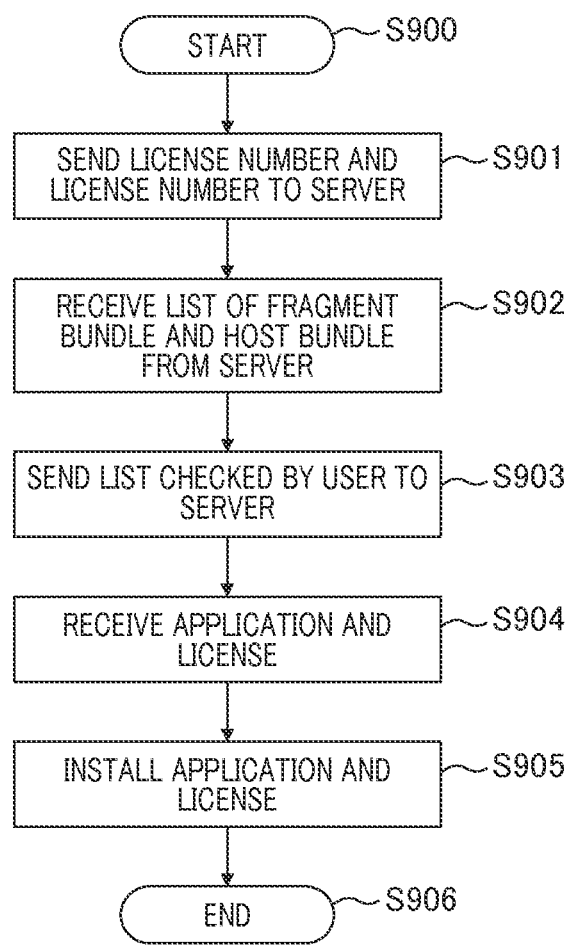
FIG. 9 illustrates an example of the application acquisition process.

FIG 9 is a flowchart that illustrates an example of the application acquisition process by the image forming apparatus. Firstly, the processing is started in S900. The application acquisition app 502 of the image forming apparatus 101 sends the serial number and the license number to the application distribution server 102 (S901). Then, the application acquisition app 502 receives the list of the fragment bundles and host bundles from the application distribution server 102 (S902).

Then, the application acquisition app 502 sends the list of applications checked (selected) by a user to the application distribution server 102 (S903).

Next, the application acquisition app 502 receives the application and the license from the application distribution server 102 (S904). The application acquisition app 502 installs the received application and the license through the installer 503 (S905), and the processing is terminated (S906).

Figure 10:
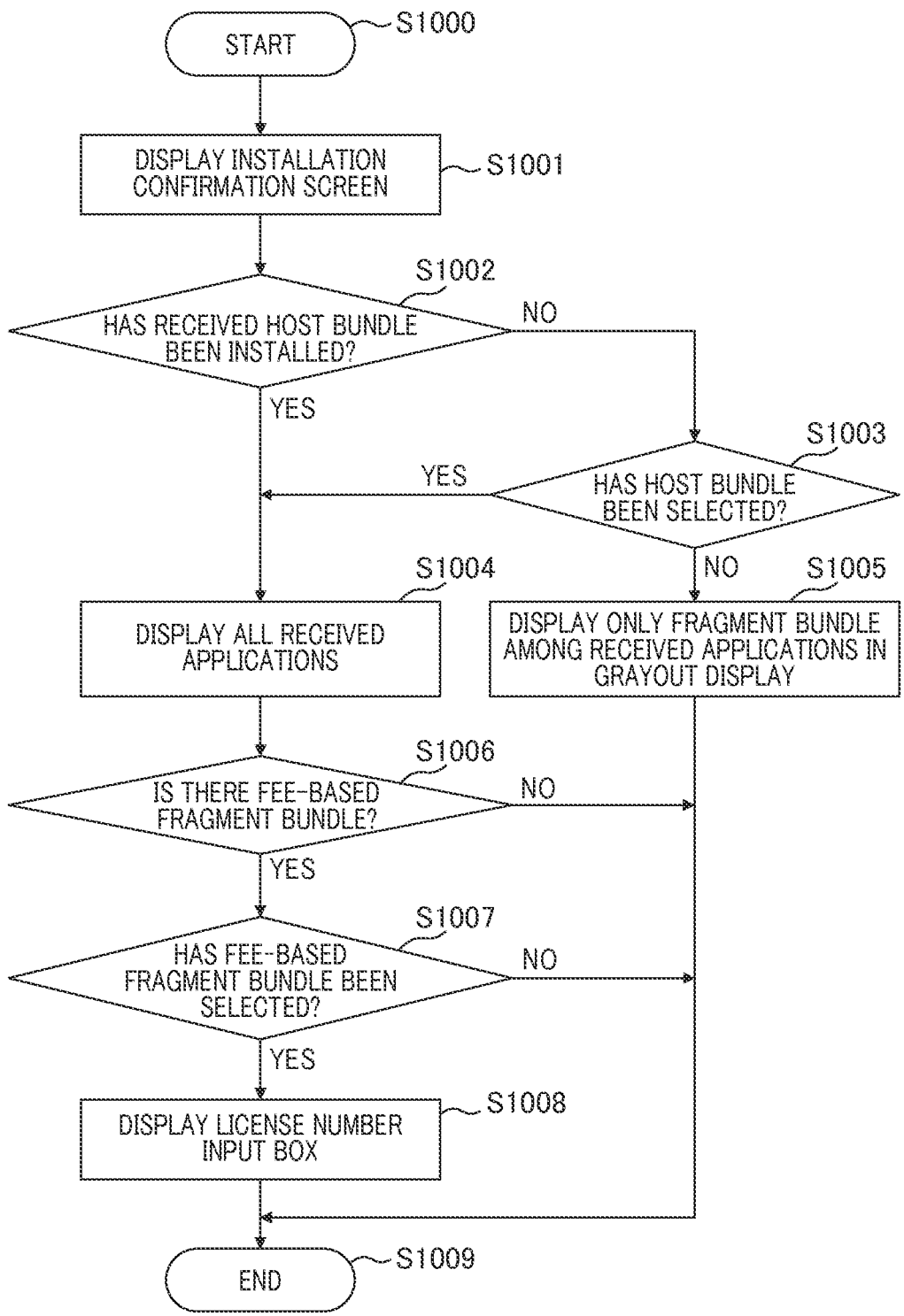
FIG. 10 is a flowchart illustrating an example of the display process of the installation confirmation screen.

FIG. 10 is a flowchart illustrating an example of the display process of the installation confirmation screen by the image forming apparatus. The installation confirmation screen is a screen used in order to select the application for installation on the image forming apparatus 101.

Firstly, the application acquisition app 502 displays the installation confirmation screen (S1001). The application acquisition app 502 determines whether the host bundle received from the application distribution server 102 is installed on the image forming apparatus 101.

When the host bundle received from the application distribution server 102 is installed on the image forming apparatus 101, the application acquisition app 502 displays all the applications received from the application distribution server 102 (S1004).

When the host bundle received from the application distribution server 102 is not installed on the image forming apparatus 101, the application acquisition app 502 determines whether the host bundle has been selected on the installation confirmation screen (S1003). When the host bundle has not been selected, the application acquisition app 502 displays only fragment bundles from among the received applications in a grayout display on the installation confirmation screen (S1005), and processing is terminated (S1009).

When the host bundle has been selected, the processing proceeds to S1004. In S1006, the application acquisition app 502 determines whether there is a fee-based fragment bundle in the displayed application (S1006). When there is no fee-based fragment bundle, the processing is terminated (S1009).

When there is a fee-based fragment bundle, the processing proceeds to S1007. The application acquisition app 502 determines whether the fee-based fragment bundle has been selected. When the fee-based fragment bundle has not been selected, the processing is terminated (S1009). When the fee-based fragment bundle has been selected, the application acquisition app 502 displays a license number input box (S1008), and the processing is terminated. The license number input box is an input column for inputting the license number. The information processing unit 523 of the application distribution server 102 does not distribute the fee-based fragment bundle when the license number is not input into the license number input box. That is to say, the information processing unit 523 controls the distribution of the fragment bundle in response to the type of fragment bundle.

Figure 13:
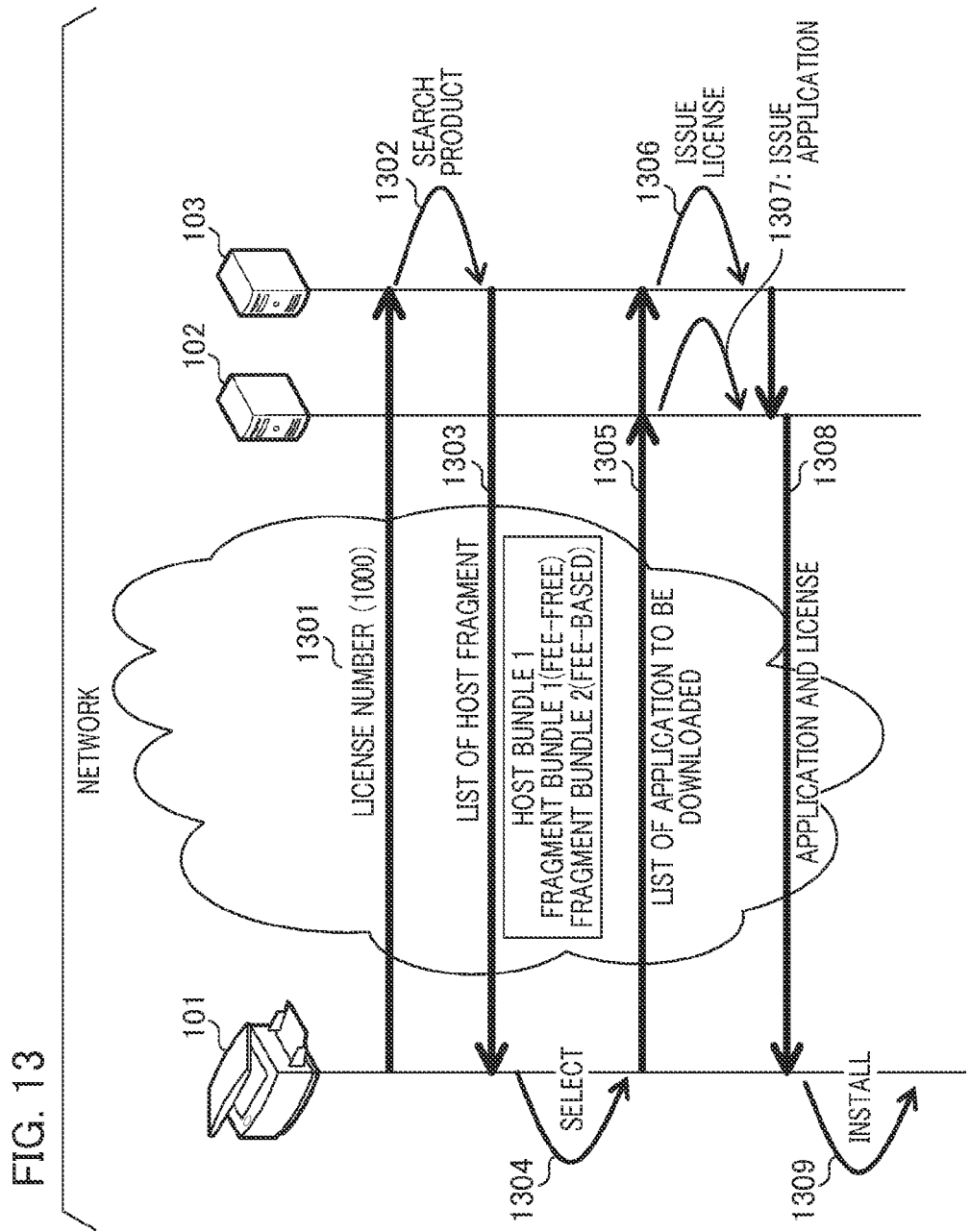
FIG. 13 illustrates a sequence diagram describing an example of the acquisition process of a fragment bundle.

FIG. 13 is a sequence diagram illustrating an example of the acquisition process of a fragment bundle in response to the input of the license number. In the example, the image forming apparatus 101 acquires and installs, into the image forming apparatus 101, a related fragment bundle from the application distribution server 102 in response to an input by a user of the license number for the fragment bundle product.

Firstly, the image forming apparatus 101 sends the license number "1000" input by the user to the application management server 103 through the application distribution server 102 (S1301). Then, the application management server 103 refers the product management table 1101, and specifies a product corresponding to the license number "1000". The example of the product management table 1101 illustrated in FIG. 11 enables specification that the license number "1000" is a product of the host bundle 1.

Then, the application management server 103 refers the app management table 1201, and specifies the fragment bundle that is linked to the host bundle. The example of the app management table 1201 illustrated in FIG. 12 enables specification that the fee-free fragment bundle 1 and the fee-based fragment bundle 2 are linked to the host bundle 1. Therefore, the application management server 103 sends the list of the host bundle 1, the fee-free fragment bundle 1 and the fee-based fragment bundle 2 to the image forming apparatus 101 (S1303).

Next, the user selects the application for installation (S1304). The image forming apparatus 101 sends the list of the applications for download to the application distribution server 102 (S1305). That is to say, the application acquisition app 502 of the image forming apparatus 101 requests the application distribution server 102 to distribute the selected application. The information processing unit 512 of the application distribution server 102 requests the application management server 103 to issue a license by notifying the request.

Next, the application management server 103 issues the license (S1306). The application distribution server 102 issues the app (S1307). The information processing unit 512 provided in the application distribution server 102 sends the issued application and license to the image forming apparatus 101 (S1308). The image forming apparatus 101 installs the received application and license.

As described with reference to FIG. 8 and FIG. 13, the information processing unit 512 provided in the application distribution server 102 distributes the host bundle specified by the license number and/or the fragment bundle linked to the host bundle to the image forming apparatus.

Figure 16A:
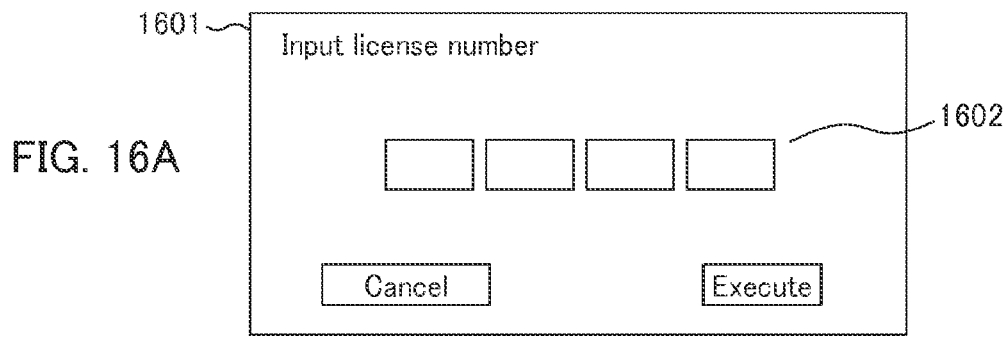
FIG. 16A to FIG. 16D illustrate an example of a selection screen and an installation completion screen.

FIG. 16A to FIG. 16D illustrate an example of a screen displayed by the application acquisition app 502 when acquiring an application. FIG. 16A illustrates an input screen 1601 for inputting the license number.

The user inputs the license number into the input column 1602. When the user presses the execute button, the application acquisition app 502 sends the license number to the application distribution server 102.

Figure 16B:
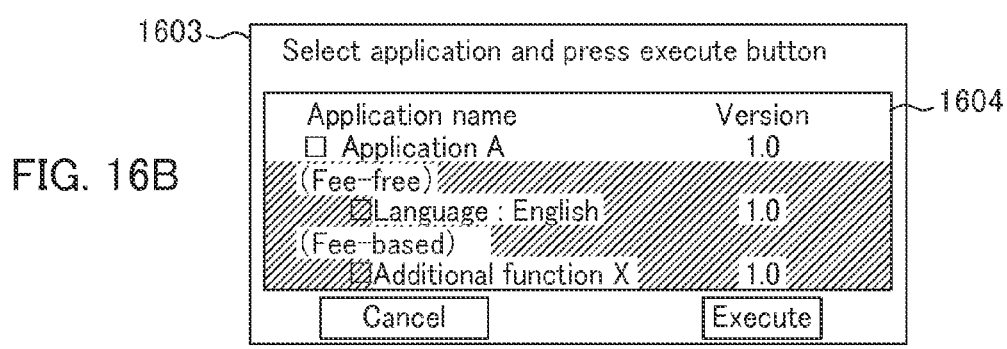

The application acquisition app 502 receives the list of applications linked to the license number from the application distribution server 102, and displays the selection screen 1603 illustrated in FIG. 16B. The selection screen 1603 is a screen for selecting an application included in the list. In this example, the application acquisition app 502 displays a fragment bundle that matches the set language of the image forming apparatus 101 among the fragment bundles included in the list received from the application distribution server 102.

The input column 1604 is the display column for selecting the application to be installed. In this example, assume that the application A that is a host bundle is not installed on the image forming apparatus 101. Therefore, the fee-free "language: English" and the fee-based "additional function X" that are fragment bundles are subject to grayout processing and cannot be selected. That is to say, when the host bundle included in the list is not installed on the image forming apparatus 101, the application acquisition app 502 executes the following processing. The application acquisition app 502 controls a display so that a fragment bundle that is linked to a host bundle cannot be selected when that host bundle is not selected on the selection screen.

Figure 16C:
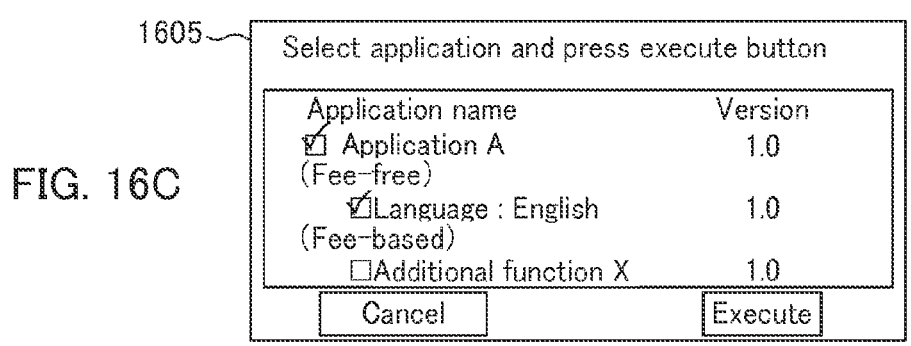
Figure 16D:
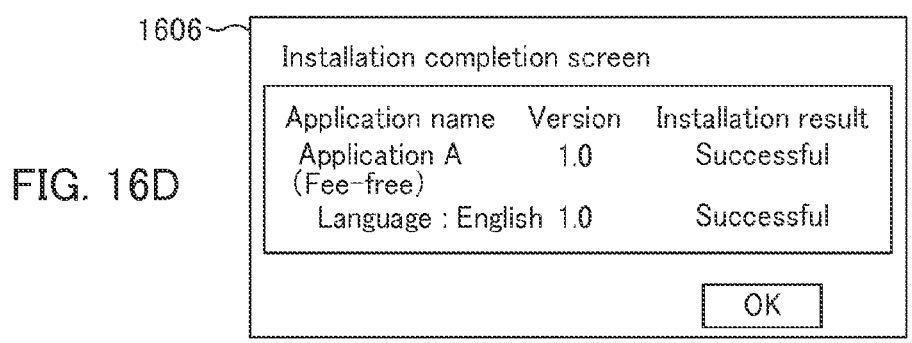

When a user checks the application A is checked on the selection screen 1603, the application acquisition app 502 displays the input screen 1605 illustrated in FIG. 16C. The user can select the fee-free "language: English" and the fee-based "additional function X" that are fragment bundles on the selection screen 1605. When the user selects an application to be installed and presses the execute button, the application acquisition app 502 requests the application distribution server 102 to distribute the selected application. The application acquisition app 502 receives and installs the application distributed from the application distribution server 102 and displays the installation completion screen illustrated in FIG. 16D.

FIG. 17A illustrates the selection screen 1701 that is displayed by the application acquisition app 502 when the application A that is the host bundle has been installed on the image forming apparatus 101. The fee-free "language: English" and the fee-based "additional function X" can be selected on the selection screen 1701 even when the application A is not selected. That is to say, the application acquisition app 502 controls a display so that a fragment bundle linked to the host bundle can be selected even if the host bundle on the selection screen is not selected. FIG. 17B illustrates a state in which only the fragment bundle is selected by a user on the selection screen 1701. When the user presses an execute button, the screen transitions to the installation completion screen illustrated in FIG. 17C.

Figure 18A:
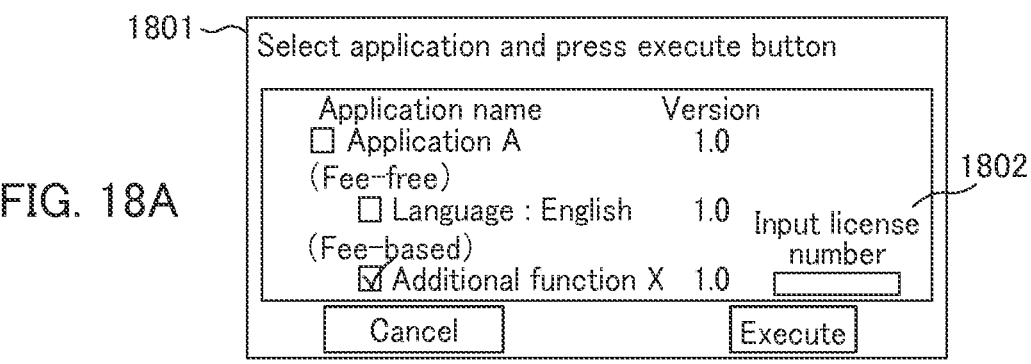
FIG. 18A and FIG. 18B illustrate an example of a selection screen and an installation completion screen.
Figure 18B:
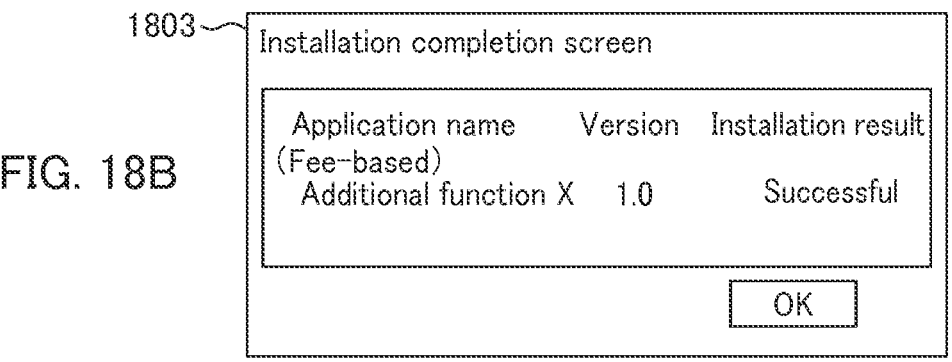

When a user selects fee-based "additional function X" on the selection screen 1701 illustrated in FIG. 17A, as illustrated in FIG. 18A, the application acquisition app 502 displays a selection screen 1801 that prompts the input of the license number. More specifically, the application acquisition app 502 displays a license number input box 1802. After a user inputs the license number that has been additionally purchased into the license number input box 1802, and presses the execute button, the application acquisition app 502 requests the application distribution server 102 to distribute the fee-based "additional function X". Then when the "additional function X" distributed from the application acquisition app 502 is installed, the screen transitions to an installation completion screen 1803 illustrated by FIG. 18B.

FIG. 19A illustrates a selection screen 1901 displayed when updating the application after installation. The application acquisition app 502 displays the selection screen 1901 in accordance with a user operation. The application acquisition app 502 displays an installed app list on the selection screen 1901. For this reason, the application acquisition app 502 stores and retains the license number upon a new application installation on the HDD 204.

When the user selects an application to be updated and presses the execution button on the selection screen 1901, the application acquisition app 502 sends the license number retained in advance therein to the application distribution server 102. In this manner, the user is not required to perform input of the license number other than upon the new application installation.

When the user presses the execute button after selecting the application to be installed, the application acquisition app 502 displays the selection screen illustrated in FIG. 19B. As illustrated in FIG. 19C, when the user selects by checking an application to be installed, and presses the execute button, the screen transitions to the installation completion screen illustrated in FIG. 19D.

According to the exemplary embodiments described above, linkage and management of the host bundle and the fragment bundle, and distribution of the host bundle and the fragment bundle in response to a request from the image forming apparatus are enabled.

FIG. 20A illustrates an example of a selection screen for selecting an application to be installed according to another exemplary embodiment. The application acquisition app 502 controls to prevent installation of more than several predetermined types of fragment bundles. In this manner, resources such as the HDD capacity of the image forming apparatus 101 are limited.

As illustrated in FIG. 20A, the application acquisition app 502 displays a plurality of fragment bundles in the list received from application distribution server 102 on the selection screen 201. In this example, the fragment bundle is preset to prevent more than three types of installation. That is to say, the application acquisition app 502 controls a display so that more than or equal to a predetermined number of fragment bundles cannot be selected.

When a user selects three types of fragment bundles corresponding respectively to English, French and Italian, the application acquisition app 502 displays the remaining fragment bundles in a grayout display as illustrated on the selection 2002 in FIG. 20B for disabling selection. When the user presses the execute button, the screen transitions to the installation completion screen 2003 illustrated in FIG. 20C.

The application acquisition app 502 may be configured so that the fragment bundles included in the list received from the application distribution server 102 are not displayed on the selection screen. Furthermore, the application acquisition app 502 may be configured so that a request is output to the application distribution server 102 for distribution of all fragment bundles included in the list.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-028658 filed Feb. 18, 2013, which is hereby incorporated by reference herein in its entirety.

What is claimed is:

1. A distribution apparatus that distributes an application program to a device, comprising:
a processor, and
a memory in communication with the processor including instructions that, when executed, cause the processor to control:
an accepting unit configured to accept registration of an application program configured to provide a specific service to a device and an extension application program configured to extend the specific service of the application program,
a managing unit configured to manage the extension application program by linking it with an application program when the application program that is specified by the extension application program is registered, and
a distributing unit configured to distribute, to the device, an application program specified by a license key and/or an extension application program linked to the application program in response to a request via a selection screen displayed on a display unit of the device when the license key sent from a transmitting unit of the device has been received,
wherein the distributing unit distributes, to the device, a list of the application program specified by the license key and the extension application program linked to the application program, and the display unit displays an input column for the license key when the application program that is included in the list has been installed onto the device and the extension application program selected on the selection screen is fee-based, and
wherein the distributing unit distributes the fee-based extension application program when the license key is inputted into the input column for the license key.

2. The distribution apparatus according to claim 1, wherein the distributing unit is configured to control the distribution of the extension application program linked to the application program in response to a type of the extension application program.

3. The distribution apparatus according to claim 1, wherein, the managing unit is configured to manage the extension application program by linking it with type information for the extension application as well as the application program and manage the application program by linking it with the license key, and
the distribution unit is configured to specify the application program that is managed by linking it with the received license key and distribute the extension application program that is managed by linking it with the specified application program.

4. The distribution apparatus according to claim 1, further comprising a display unit configured to display a management screen for the application program,
wherein the display unit is configured to display a setting screen for the extension application program, that specifies the application program, in response to an operation on the management screen, and
wherein the management unit is configured to manage the extension application program selected on the setting screen by linking it with the application program.

5. The device that receives the distribution of the application program from the distribution apparatus according to claim 1, comprising:
a processor; and
a memory in communication with the processor storing instructions that, when executed, cause the processor to control:
a transmitting unit configured to send the license key to the distribution apparatus,
a display unit configured to receive, from the distribution apparatus, the list of the application program specified by the license key and the extension application program linked to the application program and display the selection screen for the application program and the extension application program included in the list,
a request unit configured to request the distribution apparatus to distribute the application program or the extension application program selected on the selection screen, and
a receiving unit configured to receive the application program or the extension application program distributed by the distribution apparatus in response to the request,
wherein the display unit is configured to display the input column for the license key when the application program that is included in the list has been installed onto the device and the extension application program selected on the selection screen is fee-based, and
wherein the request unit is configured to request the distribution apparatus to distribute the fee-based extension application program when the license key is inputted into the input column for the license key.

6. The device according to claim 5, wherein the display unit is configured to display an extension application program that is adapted to the set language of the device among the extension application programs included in the list on the selection screen.

7. The device according to claim 5, wherein the display unit is configured to control a display so that greater than or equal to a predetermined number of the extension application programs among the extension application programs that are included in the list cannot be selected on the selection screen.

8. The device according to claim 5, wherein, when the application program that is included in the list has not been installed onto the device, the display unit is configured to control a display so that the extension application program that is linked to the application program cannot be selected if the application program is not selected on the selection screen.

9. The device according to claim 5, wherein, when the application program that is included in the list has been installed onto the device, the display unit is configured to control a display so that the extension application program that is linked to the application program can be selected even if the application program is not selected on the selection screen.

10. The device according to claim 5, wherein the display unit is configured to not display the extension application program included in the list on the selection screen, and
wherein the request unit is configured to request the distribution apparatus to distribute all of the extension application programs included in the list.

11. A control method of a distribution apparatus for distributing an application program to a device, comprising:
accepting registration of an application program configured to provide a specific service to a device and an extension application program configured to extend the specific service of the application program;
managing the extension application program by linking it with an application program when the application program that is specified by the extension application program is registered; and
distributing, to the device, an application program specified by a license key and/or an extension application program linked to the application program in response to a request via a selection screen displayed on a display unit of the device when the license key sent from a transmitting unit of the device has been received,
wherein, in the distributing, a list of the application program specified by the license key and the extension application program linked to the application program is distributed to the device, and the display unit displays an input column for the license key when the application program that is included in the list has been installed onto the device and the extension application program selected on the selection screen is fee-based, and
wherein the fee-based extension application program is distributed when the license key is inputted into the input column for the license key.

12. A non-transitory storage medium on which is stored a computer program for making a computer execute a control method of a distribution apparatus that distributes an application program to a device, comprising:
accepting registration of an application program configured to provide a specific service to a device and an extension application program configured to extend the specific service of the application program;
managing the extension application program by linking it with an application program when the application program that is specified by the extension application program is registered; and
distributing, to the device, an application program specified by a license key and/or an extension application program linked to the application program in response to a request via a selection screen displayed on a display unit of the device when the license key sent from a transmitting unit of the device has been received,
wherein, in the distributing, a list of the application program specified by the license key and the extension application program linked to the application program is distributed to the device, and the display unit displays an input column for the license key when the application program that is included in the list has been installed onto the device and the extension application program selected on the selection screen is fee-based, and
wherein the fee-based extension application program is distributed when the license key is inputted into the input column for the license key.

13. A system comprising:
a distribution apparatus;
a device that receives the distribution of the application program from the distribution apparatus;
a processor; and
a memory in communication with the processor storing instructions that, when executed, cause the processor to control:
in the distribution apparatus,
an accepting unit configured to accept registration of an application program configured to provide a specific service to a device and an extension application program configured to extend the specific service of the application program;
a managing unit configured to manage the extension application program by linking it with an application program when the application program that is specified by the extension application program is registered; and
a distributing unit configured to distribute, to the device, an application program specified by a license key and/or an extension application program linked to the application program in response to a request from the device when the license key has been received from the device,
in the device,
a transmitting unit configured to send the license key to the distribution apparatus;
a display unit configured to receive, from the distribution apparatus, a list of the application program specified by the license key and the extension application program linked to the application program, and display a selection screen for the application program and the extension application program included in the list;
a request unit configured to request the distribution apparatus to distribute the application program or the extension application program selected on the selection screen; and
a receiving unit configured to receive the application program or the extension application program distributed by the distributing unit of the distribution apparatus in response to the request,
wherein the distributing unit distributes, to the device, a list of the application program specified by the license key and the extension application program linked to the application program, and the display unit displays an input column for the license key when the application program that is included in the list has been installed onto the device and the extension application program selected on the selection screen is fee-based, and
wherein the distributing unit distributes the fee-based extension application program when the license key is inputted into the input column for the license key.

* * * * *